May 3, 1938. H. BANY 2,116,378
CONTROL SYSTEM
Filed July 30, 1936
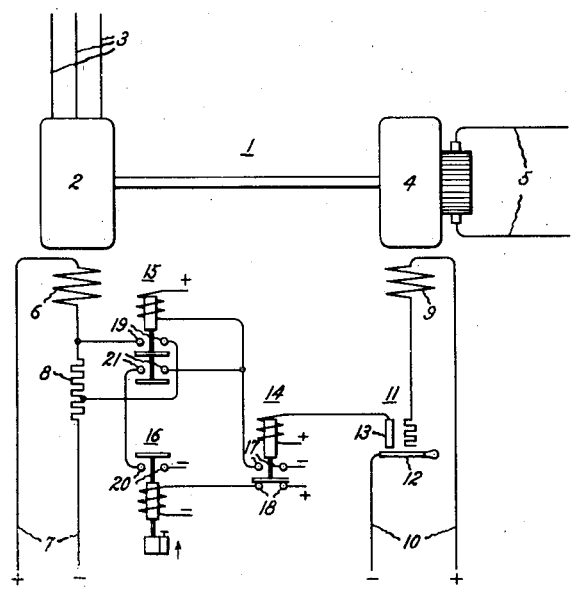
Inventor:
Herman Bany,
by Harry E. Dunham
His Attorney.

Patented May 3, 1938

2,116,378

UNITED STATES PATENT OFFICE 2,116,378

CONTROL SYSTEM

Herman Bany, Lansdowne, Pa., assignor to General Electric Company, a corporation of New York Application July 30, 1936, Serial No. 93,409

3 Claims. (Cl. 171—123)

My invention relates to control systems and particularly to systems for controlling the excitation of a synchronous motor of a synchronous motor generator set in accordance with the load on the generator thereof.

In certain types of electric systems of distribution, it is the practice to supply the current to a local load, such as an electric shovel, by means of a synchronous motor generator set. The amount of current supplied to the load is varied by varying the excitation of the generator of the set. Heretofore, in such a system, there has been no regulation of the synchronous motor excitation as the load on the generator was increased. Since a relatively high value of field excitation has to be applied to the synchronous motor in order to prevent it from pulling out of step under certain operating conditions, it has been found that in some cases this high field excitation causes the power factor of the motor to be of such a leading value at no load as to be objectionable.

One object of my invention is to provide an improved arrangement for controlling the excitation of a synchronous motor so that under all load conditions the power factor thereof is of such a value as not to be objectionable.

My invention will be better understood from the following description when taken in connection with the accompanying drawing, the single figure of which diagrammatically illustrates a synchronous motor field control arrangement embodying my invention, and its scope will be pointed out in the appended claims.

Referring to the drawing, 1 represents a synchronous motor generator set comprising a synchronous motor 2 connected to an alternating current supply circuit 3 and driving a generator 4, which is arranged to supply current to a load circuit 5. The motor 2 is provided with a field winding 6, which is connected to a suitable source of excitation 7 through a suitable impedance, such as a resistor 8. The generator 4 is provided with a field winding 9, which is arranged to be connected across a suitable source of excitation 10 through an adjustable rheostat 11. The rheostat 11 has a movable contact member 12, which, when moved, varies the amount of resistance connected in series with the field winding 9. The rheostat 11 is also provided with a stationary contact 13, which is arranged to be engaged by the movable member 12 when it is in a position to produce an excitation of the generator field winding 9 in excess of a predetermined amount. When the contacts 12 and 13 are in engagement, a circuit is completed for a control relay 14, which, when energized, completes an energizing circuit for a field relay 15 to complete a shunt circuit around a portion of the resistor 8 and thereby increase the excitation of the motor field winding 6 a predetermined amount. Therefore, until the load on the generator exceeds a predetermined amount the motor excitation is maintained at a relatively low value to prevent the power factor of the motor from becoming too leading. However, when the generator load exceeds this predetermined value, the motor excitation is increased to the desired value to produce the maximum pull-out torque.

In order to delay the de-energization of the relay 15 for a predetermined time after the load on the generator 4 has been decreased below a predetermined value, the relay 15, when energized, is arranged to complete a locking circuit for itself through the contacts of a time relay 16. The circuit of the operating winding of the time relay 16 is arranged to be completed by the relay 14 when it is in its deenergized position. Therefore, when the movable contact member 12 of the rheostat 11 is moved out of engagement with the contact 13 and thereby effects the deenergization of the relay 14, the relay 15 does not operate to remove the shunt circuit from around a portion of the resistor 8 until sufficient time has elapsed for the time relay 16 to operate and open its contacts 20.

The operation of the arrangement shown in the drawing is as follows: After the motor 2 has been started and synchronized in any well-known manner, examples of which are well-known in the art, the movable member 12 of the rheostat 11 is adjusted to vary the current supplied to the load circuit 5 by the generator 4. The contact 13, which is adjustable is mounted in any suitable manner so that it is engaged by the movable contact 12 when it is in a position to effect an excitation of the generator field winding 9 in excess of a predetermined amount. Therefore, when the movable arm 12 is moved to increase the generator field excitation above this predetermined value, the relay 14 is energized to close its contacts 17 and open its contacts 18. By closing its contacts 17, the relay 14 completes an energizing circuit for the relay 15, which in turn, by closing its contacts 19, completes a shunt circuit around a portion of the resistor 8 to effect a predetermined increase in the excitation of the field winding 6. By opening its contacts 18, the relay 14 opens the circuit of the normally energized time relay 16. As soon as the relay 16 closes its contacts 20, a locking circuit is completed for the field relay 15 through its contacts 21 and the contacts 20 of the relay 16. Therefore, when the movable member 12 of the rheostat 11 is moved out of engagement with the contact 13 and effects the deenergization of the relay 14, the relay 15 is not deenergized to remove the shunt circuit from around the resistor 8 until the relay 14 has remained deenergized for a sufficient length of time to allow the time relay 16 to open its contacts 20 in the locking circuit of the relay 15.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a synchronous motor generator set, movable means for varying the excitation of the generator of said set, and relay means responsive to the position of said movable means for immediately increasing the excitation of said motor when said movable means is moved to a position in which the generator excitation is increased above a predetermined value and for decreasing after a predetermined time delay the excitation of said motor when said movable means is moved to a position in which the generator excitation is below a predetermined value.

2. In combination, a synchronous motor generator set, movable means for varying the excitation of the generator of said set, and relay means responsive to the position of said movable means for immediately increasing the excitation of said motor to a predetermined value when said movable means is moved to a position in which the generator excitation is increased above a predetermined value and for decreasing after a predetermined time delay the excitation of said motor to a predetermined value when said movable means is moved to a position in which the generator excitation is decreased below a predetermined value.

3. In combination, a synchronous motor having a field winding, a generator driven by said motor and having a field winding, means for supplying current to said field windings, an adjustable rheostat in series with said generator field winding, said rheostat having a movable member, and relay means responsive to the position of said movable member for effecting substantially immediately a predetermined increase in the excitation of said motor field winding when said movable member is moved to a position to increase the excitation of said generator field winding above a predetermined value and for decreasing the excitation of said motor field winding a predetermined amount when said movable member remains for a predetermined time in a position in which the excitation of said generator field winding is maintained below a predetermined value.

HERMAN BANY.